United States Patent [19]

Sweeney et al.

[11] 4,273,827
[45] Jun. 16, 1981

[54] ADHESIVE ASSEMBLY

[75] Inventors: Theodore J. Sweeney, Grosse Pointe City; John G. Haviland, Orchard Lake, both of Mich.

[73] Assignee: Theodore Sweeney & Company, Detroit, Mich.

[21] Appl. No.: 914,003

[22] Filed: Jun. 9, 1978

[51] Int. Cl.³ .................................. B32B 5/16
[52] U.S. Cl. ......................... 428/307; 156/90; 156/313; 156/306.6; 427/208; 428/31; 428/189; 428/315; 428/354; 428/355
[58] Field of Search ............... 428/343, 214, 40, 31, 428/189, 403, 307; 156/309, 90, 313; 427/208

[56] References Cited

U.S. PATENT DOCUMENTS

| 2,292,024 | 8/1942 | Dreher | 428/41 |
|---|---|---|---|
| 2,618,580 | 11/1952 | Lancaster | 156/77 |
| 2,785,083 | 3/1957 | Robinson | |
| 2,907,682 | 10/1959 | Eichel | |
| 2,951,004 | 8/1960 | Martin et al. | 156/109 |
| 2,988,460 | 6/1961 | Eichel | |
| 3,121,021 | 2/1964 | Copeland | 128/156 |
| 3,261,458 | 7/1966 | Nibecken | |
| 3,565,247 | 2/1971 | Brochman | 428/343 |
| 3,592,722 | 7/1971 | Morgan | |
| 3,639,137 | 2/1972 | Marinelli | 428/307 |
| 3,745,056 | 7/1973 | Jackson | |
| 3,813,279 | 5/1974 | Varner, Jr. | 428/307 |
| 3,881,042 | 4/1975 | Ungerer | 428/67 |
| 3,908,052 | 9/1975 | Sanders | 428/1 |
| 3,973,562 | 8/1976 | Green | 428/343 |
| 4,039,705 | 8/1977 | Douek et al. | 428/40 |
| 4,061,805 | 12/1977 | Thompson | 428/343 |
| 4,076,774 | 2/1978 | Short | 264/4 |
| 4,086,388 | 4/1978 | Brown | 428/315 |
| 4,090,906 | 2/1978 | Short | 264/4 |

*Primary Examiner*—George F. Lesmes
*Assistant Examiner*—E. Rollins Buffalow
*Attorney, Agent, or Firm*—Burton, Parker & Schramm

[57] ABSTRACT

Described is an adhesive assembly containing a first adhesive and a second adhesive which is of a different strength or chemical composition than the first adhesive and positioned between the first and second adhesives is a barrier means for preventing contamination of the respective adhesives or the substrates to which they adhere wherein the combination of the adhesives includes a spongy or foam layer. Also described is a method of adhering together a plurality of substrates employing the adhesive assembly.

4 Claims, 13 Drawing Figures

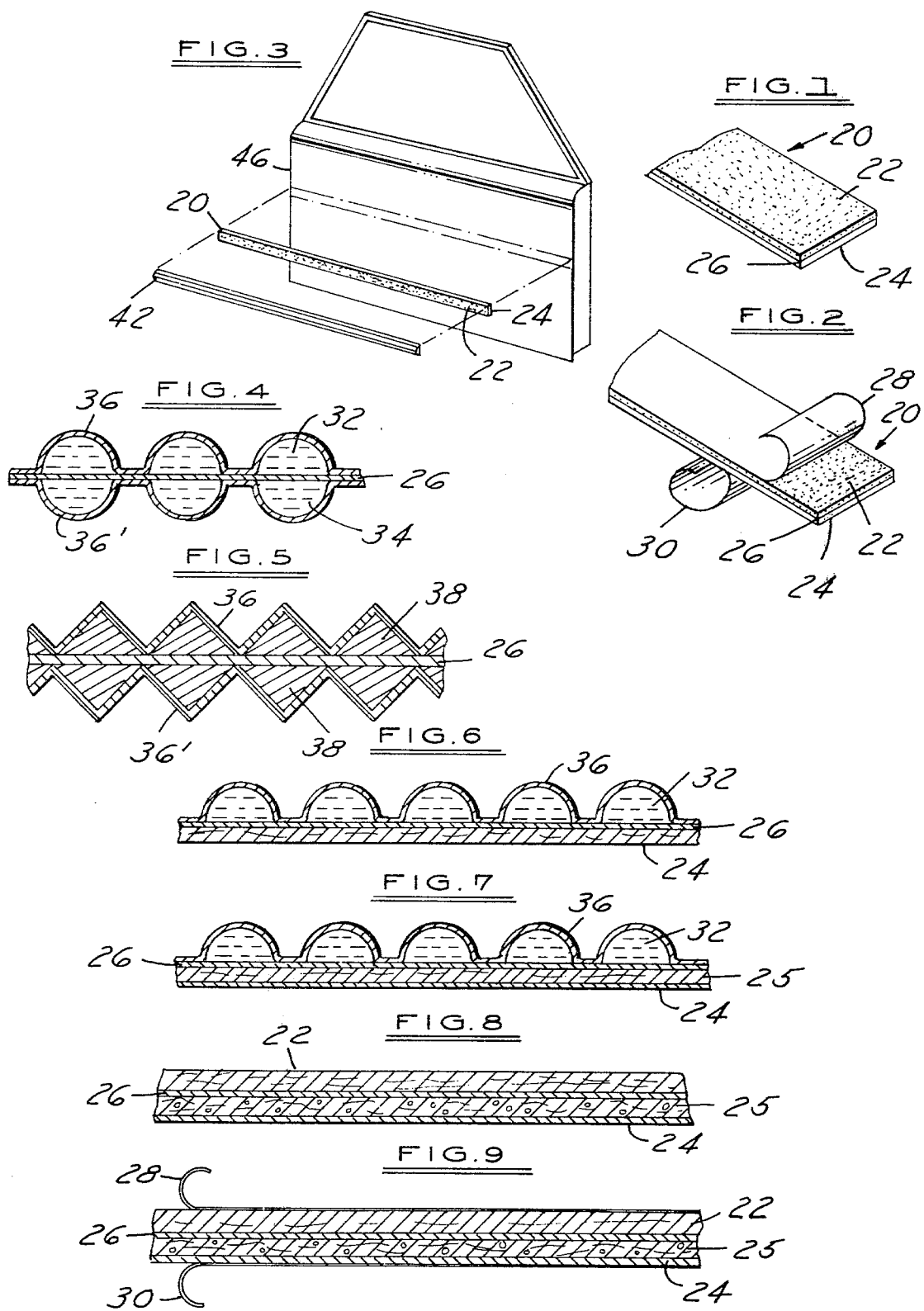

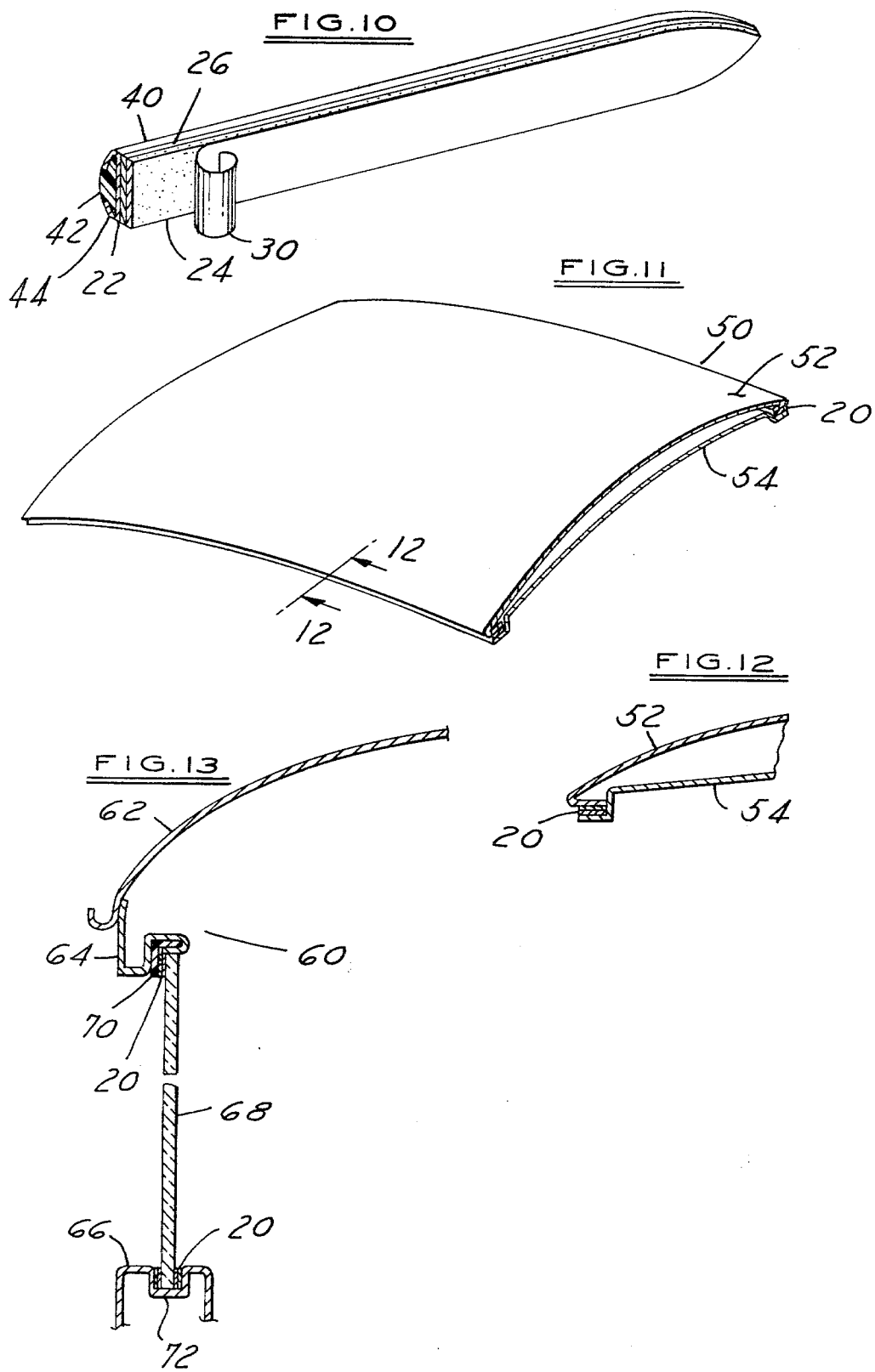

ADHESIVE ASSEMBLY

BACKGROUND OF THE INVENTION

The present invention is concerned with adhesives in general and to adhering a plurality of substrates.

It is well known in the art today that significant difficulties are associated with securing the side body moldings to vehicles due to the method of adhering the moldings to the vehicles. Currently employed is a polyvinyl chloride molding. The industry has applied a plurality of hot melt adhesive beads on the outer periphery of said molding with a bead of one component moisture curable urethane adhesive in between the two hot melt adhesives. The basic purpose of said technique is to have an immediate adhesion as the hot melt adhesive cools while a more permanent bond is effected as the one component urethane adhesive cures. However, it has been found through experience that the adhesive system employed is not fully satisfactory. Also, if a pressure sensitive adhesive is used, the molding comes away from the body of the vehicle due to degradation of the adhesive and its adhering ability to the substrate by virtue of a delamination principle or by virtue of the plasticizer that may be present in the paint on the substrate or the plasticizer that may be present in the polyvinyl chloride molding itself. Also, it has been found that the adhesion of the moldings to top coat paints of the non aqueous dispersion type is very poor. Additionally, the transportation industry has been looking for a variety of means for decreasing the weight of automotive vehicles as well as to save energy in the fabrication of vehicles. The weight problem can be partially solved by using chemical adhesives to secure a variety of components used in the transportation industry, thereby eliminating mechanical attachments or fasteners that may be employed. Additionally, mechanical supports that are used to hold windows in place may likewise be supplanted with the use of an adhesive system. Deck lids and hoods which require mechanical fastening techniques or costly supplementary aids, such as welding, can also be a place for the use of adhesives, thereby decreasing the weight of the mechanical components. Deck lids and hoods which require dual methods to insure precise fit involve costly welding and unsatisfactory adhesive bonding which result in high labor intensity due to clean up of equipment and parts and the buffing and polishing of parts to eliminate pinch weld marks. These are other advantages for adhesive use.

The theory of adhesives and the use of various adhesives are generally well known in the art. For a background on adhesives, see the *Handbook of Adhesive Bonding* edited by Charles V. Eagle, published by McGraw Hill, Inc., in particular, Chapter 19. See also *Applied Polymer Science* edited by J. Kenneth Craver and Roy W. Tess, published by the American Chemical Society, 1975, pages 473 and following, for a recitation of well known adhesives, hereby incorporated by reference.

SUMMARY OF THE INVENTION

It is an object of the present invention to provide a novel adhesive assembly. It is also an object of the present invention to attach side body moldings to vehicles with a long lasting adhesive system. It is also an object of the present invention to secure deck lid and hood components to each other. It is also an object of the present invention to secure windows in automotive vehicles, in particular, when the structure for the window is comprised of an organic plastic component.

The invention is concerned with an adhesive assembly comprising;

a. a first adhesive;

b. a second adhesive which is of a different strength or a different chemical composition than the first adhesive; and c. positioned between the first and second adhesives, a barrier means for preventing contamination of the respective adhesives or the substrates to which they adhere, wherein the adhesive assembly is selected from the adhesive group consisting of:

(1) the first adhesive is comprised of an anaerobic adhesive and the second adhesive is comprised of a spongy adhesive mass;

(2) the first adhesive is comprised of an anaerobic adhesive and the second adhesive is comprised of a foam or spongy layer with an adhesive layer atop said spongy layer; and (3) the first adhesive is comprised of a silicone or urethane adhesive and the second adhesive is comprised of a foam or spongy layer with an adhesive layer atop said spongy layer.

Basically, the invention relates to the design and utilization of the adhesive assembly as a one package albeit integrated unit.

The present invention is also concerned with a method of adhering together a plurality of substrates, especially dissimilar substrates, utilizing the assembly described above comprising the steps of:

1. applying the first adhesive to a first substrate;

2. applying a second adhesive to a second substrate; and 3. positioning a solid flexible resilient barrier means between the first and second adhesives thereby preventing contamination between the respective adhesives or the substrates to which they adhere.

BRIEF DESCRIPTION OF THE DRAWINGS

FIG. 1 is a perspective view of the adhesive assembly of the present invention;

FIG. 2 is an alternative embodiment of the adhesive assembly of the present invention by employing the assembly of FIG. 1 with removable backing;

FIG. 3 is a side perspective view showing the adhesive assembly of the present invention adhering a side body molding to a vehicle, such as the vehicle door;

FIG. 4 is a diagrammatic part section, part elevation view of one embodiment of the adhesive assembly;

FIG. 5 is a diagrammatic part section, part elevation view of an alternative adhesive assembly construction of the present invention.

FIG. 6 is a diagrammatic part section, part elevation view of an alternative embodiment of the adhesive assembly construction of the present invention.

FIG. 7 is a diagrammatic part section, part elevation view of an alternative embodiment of the adhesive assembly construction of the present invention.

FIG. 8 is a diagrammatic part, sectional part of an alternative embodiment of the adhesive assembly construction of the present invention.

FIG. 9 is a diagrammatic part, sectional part of an alternative embodiment of the adhesive assembly construction of the present invention with removable backing.

FIG. 10 is a side perspective view of a side body molding with the adhesive assembly construction attached thereto further containing a removable covering.

FIG. 11 is a deck lid employing the adhesive assembly of the present invention.

FIG. 12 is a sectional view of FIG. 11 taken along lines 12—12.

FIG. 13 is a sectional view of the window assembly in a vehicle employing the adhesive assembly construction of the present invention.

DESCRIPTION OF THE PREFERRED EMBODIMENTS

The adhesive assembly of the present invention employs any adhesive that can be secured to the barrier means. The adhesive assembly of the present invention will be used to secure a plurality of substrates together. In order to have satisfactory adhesion, the adhesive can be designed to adhere to the particular substrate that is contemplated. In this manner, the adhesives that are employed on both sides of the barrier means would be different in their characteristics. By "different" is meant that the adhesives will be of dissimilar chemical construction or be comprised of dissimilar chemical components or the adhesives will have dissimilar holding strengths so that it can be said that the adhesives are not of substantially the same identical components. By "holding strength" is meant sheer adhesion of the adhesive in the adhesive assembly.

The barrier means useful in the present invention is generally one that is impervious to the components of the adhesives. The barrier means, likewise, should be impervious to the migration of the components of a substrate to which the adhesives are applied. As has been described, the presently employed side body moldings contain plasticizers in the polyvinyl chloride side body molding. During the adhesion of the side body molding to the door of a vehicle, the plasticizer tends to degrade the adhesive, thereby preventing the adhesive from operating and functioning properly. The present invention employs a barrier means which can prevent the components of the polyvinyl chloride from passing through, or coming into contact with, the adhesive which is securing the side body molding to the wall of the vehicle.

The barrier means can also be considered a carrier means for carrying the first and second adhesives. Suitable barrier means vary with the adhesives employed but may be paper, a metallic layer, such as iron, steel, aluminum, titanium, magnesium, and alloys thereof and the like, synthetic organic plastics, such as polyvinly chloride, polyethylene nylon, polypropylene, polyester film, such as Mylar (trademark of DuPont), and the like. It is to be appreciated that the barrier means may be of any construction sufficient to carry the adhesives. Such a construction may require that the barrier means be flexible, resilient and in some cases non-flexible and have sufficient strength and have a coefficient of expansion similar to the substrate to which it will be attached, such as metal or plastics. Additionally, the barrier means may be corrugated along its longitudinal length in order to maintain its configuration after long term usage to prevent shriveling, shrinking or curling up at the end of the construction that it is employed, such as in a side body molding.

The barrier system must be designed with the particular adhesives that are to be employed. For example, if an anaerobic adhesive is used, it is known that expulsion of air is required. In such instance, the barrier means should be constructed such that the side that faces the anaerobic adhesive could be manipulated during the application of the adhesive to the substrate so that the air can be expelled from the area between the substrate, the barrier means and the anaerobic adhesive.

The substrates to which the adhesives will be applied vary quite broadly. They could be metallic substrates, such as aluminum, zinc, iron, steel, titanium, magnesium and alloys thereof, and the like, wood, glass, synthetic organic plastics, such as acrylics, acetates, cellulose, acetal, polycarbonates, polyolefins, such as polyethylene, polypropylene and the like, phenylene oxide, polyamide, such as nylon and the like, polystyrene, polyvinyl alcohol, polyvinyl acetate, polyurethanes, polysulfones, polyesters, such as polyethylene tetraphthalate, and linear polyesters, such as Mylar (trademark of DuPont for a polyester film) and the like, fluorocarbons, such as polytetrafluoroethylene, polyfluoroethylene (FEP), polychlorotrifluoroethylene, polymonochlorotrifluoroethylene such as KEL-F (trademark of DuPont for fluorocarbon products including polymers of chlorotrifluoroethylene), polyvinyl fluoride and the like, amino plastics, such as those based upon urea and/or melamine and derivatives thereof, and the like, polyethers, phenoxies, phenolics, especially those derived from bisphenol-A reacted with epichlorohydrin and the like, diallyl phthalate silicones, epoxides, ionomers such as Surlyn (trademark of DuPont) and the like, alkyds, polyallomers and laminates thereof, and the like. In addition, the substrate could be a rubber substrate, a felt substrate which may be based on cellulosic materials and the like, and other similar materials. For a listing of suitable plastics, reference may be made to 1975-1976 *Modern Plastic Encyclopedia* for a recitation of resins, film and the like. It is to be appreciated that any of the aforementioned substrates may be painted or coated with the usual primers and top coats employed, such as synthetic organic chemical resins that are lacquers, enamels, non aqueous dispersions, water soluble and water borne paints, powder coatings, and the like.

The adhesives can be formulated in known means depending upon the variety and type of adhesives that are to be employed. A way that is of significant interest is the microencapsulation technique. See "Advances in Microencapsulation Techniques", Flinn et al, *Battelle Technical Review,* 1967, hereby incorporated by reference. The encapsulation technique can be prepared by known coacervation method such as that taught in U.S. Pat. Nos. 2,800,457 and 2,800,458, hereby incorporated by reference. In addition, dual walled microcapsules can also be employed as a technique for containing the adhesive. See U.S. Pat. No. 4,076,774, hereby incorporated by reference.

A variety of means of encapsulating adhesives are well known in the art. U.S. Pat. No. 3,825,640 indicates that capsules can be manufactured in accordance with the techniques of interfacial polymerization (U.S. Pat. No. 3,432,327) or phase separation (U.S. Pat. No. 3,415,758; U.S. Pat. No. 2,800,457) or solvent exchange (U.S. Pat. No. 3,516,943) or meltable dispersion (U.S. Pat. No. 3,161,602) or mechanical methods of film impingement (U.S. Pat. No. 3,015,128) or spray drying (U.S. Pat. No. 3,016,308). A variety of classes of adhesives may be encapsulated. Some of the more familiar materials are epoxides, urethanes, unsaturated polyesters, alkyds and other resins. Liquid adhesive, such as a polythiol with an encapsulated curing agent, may be prepared thereby having a one part system such as that taught in U.S. Pat. No. 3,748,313. This technique is applicable not just to polythiol adhesives but to virtually any adhesive which requires the use of a curative, for the curative may be encapsulated and the capsule broken during the desired curing thereof. Encapsulated techniques are also taught in *Chemical Engineering*, Dec. 4, 1967, at about page 177, hereby incorporated by reference. The technique of containing an encapsulated curing catalyst for polysulfides is also taught in U.S. Pat. No. 3,505,254.

A particularly advantageous technique would be to apply a coating to the encapsulated adhesives so that they may then be applied as a normal coating composition somewhat similar to a liquid paint, thereby allowing the substrate to have the composition attached thereto, wherein the substrate is the barrier means described above. U.S. Pat. No. 3,694,243 has a meltable adhesive clinging in a dust like fashion about encapsulated adhesives, thereby permitting a variety of adhesives to be employed. The wall surrounding the adhesives would be a gelatin or a gum arabic.

One could encapsulate epoxies, polyesters, silicones, polysulfides or polyurethanes by the technique taught in U.S. Pat. No. 3,725,501, wherein multiple adhesives with separate curing agents for each were encapsulated in separate compartments so that there would be one package for the material.

If one wished to have elastomeric adhesive, U.S. Pat. No. 3,813,259 teaches a resin coated encapsulated elastomeric crumbs which contain various rubber materials.

A particularly preferred technique is the utilization of encapsulated anaerobic adhesives. Means for encapsulating said anaerobic adhesives are taught in U.S. Pat. Nos. 3,814,156; 3,826,673 and 3,826,756, hereby incorporated by reference. A pressure sensitive anaerobic adhesive composition is taught in U.S. Pat. No. 3,996,308, wherein the accelerator therefor is encapsulated.

It has been found particularly advantageous to have a means for releasing anaerobic adhesives after they have been cured as a safety mechanism. The releasing means is in direct contact with a portion of the barrier means, to which the anaerobic adhesive is attached. Basically, the releasing means is a collection of microencapsulated organic solvent, which solvent has the capability of dissolving the cured anaerobic adhesive. Utilization of such an encapsulated solvent allows a release of the anaerobic adhesive because the solvent will dissolve the anaerobic composition which is generally acrylate in nature. Formation of the encapsulated adhesive can occur through any of the appropriate techniques known in the art. See *Chemical Engineering*, supra. The application of an encapsulated anaerobic adhesive therefore must be such that the encapsulated releasing means, described above, is not ruptured prior to the curing of the adhesive. This can be accomplished by having the releasing capsules located on a particular longitudinal portion of the barrier means but juxtaposed to the cured anaerobic adhesive.

Any well known organic solvent useful for dissolving acrylic materials can be employed, such as aromatic solvents such as benzene, toluene, xylene and the like, alkyl ethers, ethylene, propylene, diethylene, dipropylene, triethylene, tripropylene glycol and the acetate derivatives thereof, such as the Cellosolve or Carbitol solvents (trademarks of Union Carbide).

The adhesives may also be secured to the barrier by means of plastic bubbles containing the adhesives. Such techniques are well known in the art. See, for example, U.S. Pat. No. 3,677,974.

A particularly advantageous technique is to employ a plurality of different adhesives as the first adhesive. Additionally, one could use a plurality of adhesives as the second adhesive. This technique can be fulfilled by encapsulating the different adhesives and securing them on one side of the barrier means. Alternatively, multiple types of adhesives could be on both sides of the barrier means, providing the adhesives are "different" as described above.

It is to be appreciated that by the encapsulation technique or by the technique of retaining the adhesive within plastic bubbles, one could use multi-component adhesives. This is the technique that may frequently be employed with polyurethanes or epoxy materials where the cross-linking agent or the curing agent employed is separate from the primary portion of the adhesive system which is the binder. Anaerobic adhesives could also be employed in the present application, especially microencapsulated anaerobic adhesives where the various components of the anaerobic system is present in a number of plastic bubbles or capsules. For example, the anaerobic composition which is the polymerizable monomer may be in one plastic bubble with the other plastic bubbles containing the polymerization inhibitor, a polymerization initiator, a polymerization accelerator, and a plasticizer and the like.

Due to the increased desire in having lighter weight transportation vehicles, significant emphasis is being placed upon synthetic organic plastics or compositions to replace metallic components, such as steel or zinc die castings, in the vehicle. Because of this, Applicant has found it desirable to employ the adhesive assembly of the present invention. Therefore, listed below are a variety of adhesives that may be employed with the particular plastic substrates to which the adhesive is to be applied. Applicant directs attention to the *Handbook of Adhesive Bonding*, supra. A variety of plastic substrates are described below for the adhesive assembly of the present invention.

If one wanted to adhere a substrate to a second substrate which is comprised of an acrylic material, one could employ as the second adhesive a polysulfide, a polyurethane, an acrylic based adhesive, an epoxy, or for a quick set the use of a polycyano acrylate or other anaerobic compositions.

If one wanted to adhere one substrate to a second substrate comprised of an acetate, cellulose, an acetal, one could employ as the second adhesive an acetate, a cellulosic composition, a polysulfide, a polycyano acrylate or rubber based polymer.

If one wished to apply a substrate to a second substrate comprised of polycarbonate, one could employ as the second adhesive a solvent cementing technique, that is, use a plastic in a solvent, for example, methylene chloride, which contains a polycarbonate, such as Lexan (trademark of GE for a polycarbonate), or one may use a silane primer together with the appropriate adhesive.

If one wished to apply a substrate to a second substrate comprised of a polyolefin, such as polyethylene, polypropylene and the like, one could employ a heat sealed technique where the second adhesive could be a polyester, a polyamide, an epoxy, a nitrile phenolic, an epoxy phenolic, a polysulfide epoxy, a polyurethane or other hot melt adhesives or a polyester (U.S. Pat. No. 3,620,402).

If one wished to adhere a first substrate to a second substrate comprised of polypropylene, one could use as the second adhesive an epoxy, a polyamide, a polysulfide epoxy, a nitrile phenolic, a polyurethane or a hot melt adhesive.

If one wished to adhere a first substrate to a second substrate comprised of phenylene oxide, one could use as the second adhesive an epoxy, a nitrile phenolic, or a polyurethane.

If one wished to adhere a first substrate to a second substrate comprised of a polyamide, such as nylon, one could employ as the second adhesive an epoxy, a nitrile phenolic, a nitrile rubber, neoprene or a urethane and the like.

If one wished to adhere a first substrate to a second substrate comprised of polystyrene, one could employ as a second adhesive a polysulfide, a Versamide (trademark of General Mills Chemical, Inc. for thermoplastic and reactive polyamide resins) epoxy, or a polyurethane.

If one wished to adhere a first substrate to a second substrate comprised of polyvinyl alcohol, polyvinyl fluoride, acetates or polyvinyl chloride, one could use a second adhesive such as nitrile rubber based adhesive, neoprene, epoxies, polyurethanes and the like. In addition, polyvinyl alcohol could be cemented with water and glycerin.

If one wished to adhere a first substrate to a second substrate comprised of a polyurethane, one could use a second adhesive based upon a polurethane elastomeric type, an epoxy, a foam which could be bonded with a polysulfide, an epoxy, a polyurethane, a nitrile-neoprene and the like.

If one wished to bind a first substrate to a second substrate comprised of a polysulfone, one could employ a second adhesive such as an epoxy, a polyurethane and the like.

If one wished to adhere a first substrate to a second substrate comprised of a polyester such as a polyethylene tetraphthalate or a linear polyester such as Mylar, one could use a second adhesive such as an epoxy, a urethane, or other elastomeric type systems.

If one wished to bind a first substrate to a second substrate comprised of fluorocarbons, such as polytetrafluoroethylene (PTFE), polyfluoroethylene (FEP), polychlorotrilfuoroethylene, polyvinyl fluoride, polymonochlorotrifluoroethylene, such as KEL-F, one can use a variety of second adhesives, although the bonding strengths are not particularly high.

If one wished to bind a first substrate to a second substrate comprised of amino plastics, such as urea or melamine based compositions, one could use the second adhesive of epoxy or a polyurethane and the like.

If one wished to bind a first substrate to a second substrate comprised of a polyether, one could use as a second adhesive an epoxy or polyurethane.

If one wished to bind a first substrate to a second substrate comprised of a phenoxide, it should be appreciated that it is difficult to adhere to the substrates; however, by employing a pre-sensitizing technique, one may employ elastomeric systems or urethane epoxies as appropriate second adhesives.

If one wished to adhere a first substrate to a second substrate, where the second substrate is comprised of a phenolic resin, one may employ second adhesives such as epoxies, epoxy phenolics, nitrile phenolics, or polyamides and the like.

If one wished to bind a first substrate to a second substrate comprised of diallyl phthalate, one could employ a second adhesive such as an epoxy, polysulfide, furanes, polyester styrenes, polyurethane, and the utilization of primers may enhance the adhesion.

If one wished to adhere a first substrate to a second substrate comprised of silicone, one could use as a second adhesive, a silicone adhesive plus a primer.

If one wished to adhere a first substrate to a second substrate comprised of an epoxy, epoxide or an epoxy fiberglass filled material, one could use as a second adhesive an epoxy, nitrile phenolic, an epoxy polyurethane or vinyl phenolic.

If one wished to bind a first substrate to a second substrate comprised of polyester and laminates thereof, one could use as a second adhesive epoxies, phenolics or polyesters.

If one wished to bind a first substrate to a second substrate comprised of ionomers, such as Surlyn (trademark of DuPont for ionomer resins), one would employ as a second adhesive an epoxy or polyurethane.

If one wished to bind a first substrate to a second substrate comprised of an alkyd, one would employ as a second adhesive an epoxy, nitrile, neoprene or polyurethane.

If one wished to adhere a first substrate to a second substrate comprised of a polyallomer, such as a polyallomer copolymer of propylene and ethylene, one could employ second adhesives which are similar to the adhesives for polyethylene and polypropylene.

It is to be appreciated that the adhesives that have been described above are well known in the art and can be formulated from well known techniques. See, for example, the following:

U.S. Pat. No. 3,639,137 teaches a metal fastener coated with a pressure-activatable encapsulated sealant system where the substrate has a curing agent attached thereto on top of which is a pressure-rupturable capsule that has a sealant therein. The sealant that is employed is primarily an adhesive of the liquid polysulfide type containing a corrosion resistant compound therein. The fastening system that is described is generally of the threaded bolt or rivet type system.

U.S. Pat. No. 2,907,682 teaches an adhesive type tape containing pressure-rupturable capsules with adhesives of two dissimilar types. Similarly, is U.S. Pat. No. 2,988,460 which teaches microscopic pressure-fracturable capsules which is a heat sensitive material, that is, that the fractured capsules will not release the adhesive until heated above 100° F. In a similar fashion, see U.S. Pat. No. 2,988,461 which teaches similar capsules containing chlorinated rubber and phthalates and chlorinated diphenyl.

U.S. Pat. No. 2,986,477 is quite similar to the U.S. Pat. No. 2,988,460 and 2,988,461 patents except that it teaches a tacky adhesive comprised of isobutylene polymer.

U.S. Pat. No. 3,663,269 teaches a wall covering that has a coating of dry encapsulated adhesive which is a heat-activatable adhesive of the acetate acrylic type.

U.S. Pat. No. 3,565,247 teaches a pressure-sensitive adhesive tape containing a multiplicity of microscopic closed cells which is formed by a blowing agent thereby foaming the adhesive. The technique is useful in a fabrication of aircraft skins from individual aluminum panels, enabling the manufacturer to insure that pressure will be maintained in the cabins of the planes traveling at high altitudes.

U.S. Pat. No. 3,578,482 relates to the screen coating of a profusion of pressure-rupturable capsules whose walls are elastic and readily distorted during their coating through a screen onto a substrate, but which are subsequently hardened while on the substrate itself.

U.S. Pat. No. 4,039,705 teaches an anaerobic pressure-sensitive adhesive stock such as sheets and self-wound tapes from which an adhesive layer including an anerobic resin system can be completely transferred to one substrate to be bonded to another and cured upon the exclusion of oxygen. The patent teaches at Column 3, Line 20 and following, that if the anaerobic pressure sensitive adhesive system contains free transition metal ions, then at least the peroxy initiator may be encapsulated in microspheres which, upon rupture and upon the exclusion of oxygen, will initiate cure.

U.S. Pat. No. 2,800,457 in general teaches the preparation of oil-containing microscopic capsules of complex hydrophilic colloid material and to a method of making them by coacervation.

U.S. Pat. No. 2,785,083 relates to a method of applying an adhesive to sheet material wherein the adhesive is a silicate glass solution which is applied to cellulosic surface materials. The technique is particularly advantageous to the application of the invention in the manufacture of plywood.

U.S. Pat. No. 3,592,722 teaches a slidable adhesive laminate which contains a pressure sensitive adhesive layer, a layer of vinyl film, a layer of release material covering the exposed surface of the adhesive layer and a backing sheet. As pressure is applied, the release dots are fractured so that the adhesive makes contact with the surface.

U.S. Pat. No. 3,750,728 teaches the use of pressure sensitive adhesive strips in wood millwork wherein the adhesive is a hot melt adhesive or a pressure sensitive adhesive.

U.S. Pat. No. 3,809,088 relates to a spray process for the deposition of spots of adhesive latexes containing carboxylic. The spots are discrete droplets of the adhesive material which is sprayed onto the substrate.

U.S. Pat. No. 3,813,279 teaches elastic foam carpet underlay which is encapsulated within a plastic bubble which is a thin flexible impervious sheet of polyethylene, also having a thin layer of saran so that hermetically sealed would be foam rubber in a certain amount of water.

U.S. Pat. No. 3,908,052 teaches liquid crystal display devices which are sealed in polyethylene materials.

Turning now to a description of the drawings, FIG. 1 shows the adhesive assembly 10 of the present invention having a first adhesive 22 and a second adhesive 24 separated by the barrier means 26. Because the invention is concerned with a double-backed adhesive, FIG. 2 shows that the adhesive assembly can have removable layers 28 and 30 on both sides of the adhesive assembly. The removable layer generally is in a peelable type material, such as paper, thin plastic film or coating, such as polyethylene, polypropylene, a nylon, Mylar and the like.

The invention is concerned with a variety of ways of retaining the adhesives on the opposite sides of the impervious barrier. FIG. 4 shows a liquid adhesive 32, which is the first adhesive, and the second adhesive 34 being on the opposite side of the impervious barrier 26. The adhesives are encapsulated within film coat 36 and 36' for the first and second adhesive means respectively. Alternatively, the film coat could be an encapsulation technique where particulate materials in the area of 0.01 microns to 100 microns are encapsulated in a known technique as described above or in a double-walled microcapsule as described in U.S. Pat. No. 4,076,774 or in plastic embodiments as described above. The key point, however, is that due to the particular nature of the adhesive a variety of means for holding the adhesive on opposite sides of the barrier means may be used. For example, FIG. 4 shows that the adhesive or any of its constituent components are in the liquid state as contrasted with FIG. 5 where the adhesive 38 is in the solid state but incorporated within the film 36 and 36'.

FIG. 6 is a preferred embodiment that relates to the adhesive assembly of the present invention wherein an anaerobic adhesive 32 which is in the liquid state is retained in a microencapsulated form by means of film 36 or by means of the plastic bubbles as described above. The impervious barrier separates the second adhesive which is preferably in this embodiment as a spongy adhesive mass. In general, utilizing the adhesive assembly of FIG. 6, a curing agent would be applied to the substrate and then the anaerobic adhesive 32 of FIG. 6 would be pressed against the substrate. In this process, the bubbles or the capsules would be burst, the air would be expelled between the impervious barrier and the metal substrate and the anaerobic composition would be cured.

The spongy surface 24 of FIG. 6 is on the backside of the impervious barrier. The spongy material could be a pressure sensitive adhesive, generally within about 1 to about 10 mils in thickness, preferably 3 to 5 mils in thickness. Suitable spongy masses would be a neoprene sponge adhesive, a polyethylene sponge adhesive, a urethane sponge adhesive and the like.

It should be appreciated that any and all of the adhesives described above may employ other components therein to make them stable to the environment and to ultraviolet light and may also contain other desirable components, such as dyes, colorants, pigments and the like. It is well known to add UV stabilizers and antioxidants to stabilize the adhesive mass.

The adhesive assembly of FIG. 7 is very similar to the adhesive assembly of FIG. 6 except that the adhesive 32 may be of a solid type and that the pressure sensitive adhesive mass 24 may contain as a protective covering 30 a roll or sheet of paper as described above.

The adhesive assembly described in FIGS. 6 and 7 can be used in those situations requiring a quick bonding of a relatively stiff item such as an automotive name plate to a surface to which it fits poorly. To effect the close fit required, it is proposed that the double-coated barrier tape shown in FIGS. 6 and 7 with the adhesive on the name plate side of the barrier be of a thick spongy adhesive nature itself or consist of a foam elastomeric spongy mass with an adhesive coating, while the other side of the barrier contains or carries the anaerobic adhesive applied just before making the bond or applied in the form of a micro-encapsulated adhesive as described above. Upon assembly by pressing on the name plate usually by a fixture or a mechanical roller, a close fit between the anaerobic coated barrier sheet and the adhering surface is assured with the inequalities taken up by the spongy mass between the other side of the barrier sheet and the name plate. The mechanical pressing breaks up the encapsulation of the adhesive present with the close fit obtained excluding the air and assuring curing of the anaerobic adhesive.

Another alternative is that shown in FIG. 7 wherein the anaerobic adhesive could be the first adhesive 32 enclosed within the plastic bubbles or microencapsulated within particulate substances as described above. Attached to the anaerobic adhesive would be the inert impervious barrier 26 which in turn is attached to a spongy foam or other type layer to which is attached the second adhesive 24. This spongy layer 25 is introduced at this point in order to facilitate handling characteristics of the substrate. This type of adhesive assembly allows sufficient "give" as the adhesive assembly is being applied to the desired substrate.

Turning to FIG. 8, there are a variety of adhesive configurations that could be employed. FIG. 8 shows that on both sides of the impervious barrier 26 is a spongy layer. The top layer 22 in this case can be a silicone or urethane adhesive caulk. Such silicone adhesives may be obtained from Dow Corning or other suppliers. Attached to the impervious barrier could be a foam or spongy layer to which is attached the adhesive 24. The foam or spongy layer can be prepared in a well known manner. In the configuration shown in FIG. 8 the impervious barrier 26 may act more as a carrier because of the nature of silicone adhesives. The barrier can also act as an ultraviolet barrier to prevent the degradation of the silicone sealant. Frequently, the composition such as that shown in FIG. 8 may be used to adhere glass windows to a metallic substrate on one side and a plastic substrate on the other side. It is to be appreciated that the adhesives as described above could be used depending upon the plastic substrate one wishes to adhere a second substrate thereto. For example, one may wish to have a fiberglass reinforced polyester substrate adhered to glass. This may be accomplished by employing an epoxy cement or sealant or adhesive on one side and have the silicone adhesive on the other side. It should be kept in mind that a spongy layer such as that shown in FIG. 8 would be desirable in order to impart flexibility to a glass assembly preventing building up of high stresses due to differences in coefficient of expansion when the assembly is subjected to cold temperatures. FIG. 9 shows the adhesive assembly of FIG. 8 except containing peelable backing 28 and 30, such as paper.

It is to be appreciated that the adhesive assembly of the present invention disclosed in FIGS. 1 and 2 may be sold as a unit. Alternatively, they may be sold to manufacturers of side body molding. In this situation, FIGS. 3 and 10 show that the side body molding 40 is comprised of polyvinyl chloride or other type materials such as Surlyn or polyester 42 encased with a metal extrusion 44 having a Mylar coating (not shown). See U.S. Pat. No. 3,745,056. The PVC 42 is adhered to first adhesive member 22 to which is attached the impervious barrier 26 and to which is attached the second adhesive layer 24. Again, a plastic or paper roll or covering 30 would be attached to the second adhesive 24 in order to make the side body molding handleable. After the paper covering 30 is removed from the side body molding of FIG. 10, it is then applied as best shown in FIG. 3 where the adhesive assembly 20 is shown in perspective as it is about to be attached to the automotive door 46. Adhesive 24 could be any adhesive that preferably binds or adheres to metal which is the door substrate, while adhesive 22 would preferably be one that adheres best to a PVC or other type plastic of which the side body molding 40 is comprised.

A deck lid 50 is shown in FIGS. 11 and 12 comprising a top member 52 and a bottom member 54 secured by means of the adhesive assembly 20 best shown in FIG. 12. It has been found that the top and bottom members of the deck lid are comprised of dissimilar materials, and therefore it is highly desirable that the first adhesive 22 in adhesive assembly 20 be one that adheres best to the upper deck lid component 52, while the second adhesive 24 would be one that preferentially binds with the metallic portion 54. In a similar fashion, a multicomponent hood could be assembled with desirable adhesives.

FIG. 13 is a window assembly 60 which is comprised of a roof member 62 to which is attached a top support 64 and a bottom support member 66. The window 68 is fixedly retained within the upper and lower sections 64 and 66 respectively. The upper member 64 has a synthetic plastic member 70 used to retain the window in position. The adhesive assembly 20 is inserted between the plastic member 70 and the glass 68. In the insertion of the glass in the lower member 66, the adhesive assembly is used as follows: A strip of adhesive assembly is applied to a glass frame 68 so that it engages the periphery of the glass frame in a U-shaped capacity. Inserting the glass into the window assembly, the adhesive assembly 20 is also placed along the periphery of the top portion of the glass. From the inside of the vehicle the glass is then inserted into the U-shaped portion 72 of the lower member 68 thereby retaining the glass in the receptacle and the top portion is then snapped into position using adhesive assembly 20 coming into contact with the plastic member 70.

It, therefore, can be seen that the adhesive that is used to secure the plastic could be one type of adhesive, such as the adhesives described above depending upon the plastic, while the other side of the adhesive assembly would contain an adhesive that would preferably adhere to the glass and have high tensile shear strength, such as a silicone adhesive, with or without a spongy foam layer as described above, or other type adhesives. Additionally, the adhesive that may be used to retain the glass could be a butyl rubber tape such as that that is made commercially available by PPG. The tape is soft enough to easily deform when glass is pressed into place, and it accommodates the poor fit between glass surface and a sheet metal. For higher strength, a polysulfide rubber adhesive may be employed such as that sold by Thikol Corporation. It has been found desirable that an amino silane (manufactured by Goodrich or Union Carbide) wiped onto the glass surface would assure maximum adhesion to the glass prior to the application of the polysulfide rubber.

Alternatively, a high strength urethane caulk may be used. The material is a one component caulk which is extruded onto the primer coated glass and cures by absorption of moisture from the air. A glass primer is used with the adhesive urethane caulk, which is an aliphatic urethane containing suitable pigments and antioxidants to give food resistance to ultraviolet rays from the sun. Other adhesives, such as epoxies could also be used to adhere the glass, but reasonable softness is needed to prevent localized overloading and breakage of the glass due to impact or stresses induced by differences in coefficient expansion between the filled epoxy and the glass and the body steel.

What is claimed is:
1. An adhesive assembly comprising;

a. a first adhesive;
b. a second adhesive which is of a different chemical composition than the first adhesive and wherein the adhesive is encapsulated or is retained in bubbles of a plastic film; and
c. positioned between said first and second adhesives, a barrier means for preventing contamination of the respective adhesives or the substrates to which they adhere, wherein said barrier means is also a carrier means for carrying said adhesives; and components a, b and c being an integral assembly, wherein the adhesive assembly is selected from the adhesive group consisting of:
(1) the second adhesive is comprised of an anaerobic adhesive and the first adhesive is comprised of a spongy adhesive mass;
(2) the second adhesive is comprised of an anaerobic adhesive and the first adhesive is comprised of a foam or spongy layer with an adhesive layer atop said spongy layer; and
(3) the second adhesive is comprised of a silicone or urethane adhesive and the first adhesive is comprised of a foam or spongy layer with an adhesive layer atop said spongy foam.

2. The assembly of claim 1 wherein the second adhesive is comprised of an anaerobic adhesive and the first adhesive is comprised of a spongy adhesive means.

3. The assembly of claim 1 wherein the second adhesive is comprised of an anaerobic adhesive and the first adhesive is comprised of a foam or spongy layer with an adhesive layer atop said spongy layer.

4. The assembly of claim 1 wherein the second adhesive is comprised of a silicone or urethane adhesive and the first adhesive is comprised of a foam or spongy layer with an adhesive layer atop said spongy layer.

* * * * *